(12) United States Patent
Anand et al.

(10) Patent No.: US 11,868,423 B1
(45) Date of Patent: Jan. 9, 2024

(54) GENERATION OF FILTER AND PARAMETER CONTEXT URIS

(71) Applicant: SAP SE, Walldorf (DE)

(72) Inventors: Ashish Anand, Bangalore (IN); Suneet Agarwal, Bangalore (IN); Bhuwan Rawat, Dehradun (IN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/071,896

(22) Filed: Nov. 30, 2022

(51) Int. Cl.
  *G06F 15/16* (2006.01)
  *G06F 16/955* (2019.01)
  *H04L 67/02* (2022.01)

(52) U.S. Cl.
  CPC ......... *G06F 16/9558* (2019.01); *H04L 67/02* (2013.01)

(58) Field of Classification Search
  None
  See application file for complete search history.

(56) References Cited

U.S. PATENT DOCUMENTS

| | | | |
|---|---|---|---|
| 9,846,730 B2 * | 12/2017 | Nigam | G06F 16/20 |
| 10,810,110 B1 * | 10/2020 | Thomas | G06F 11/3664 |
| 2014/0156634 A1 * | 6/2014 | Buchmann | G06F 16/24544 707/714 |
| 2018/0069931 A1 * | 3/2018 | Kumar | H04L 67/141 |
| 2018/0307692 A1 * | 10/2018 | Yuan | G06F 16/252 |
| 2019/0065014 A1 * | 2/2019 | Richter | G06T 11/60 |
| 2019/0294610 A1 * | 9/2019 | Naidu | G06F 16/25 |
| 2021/0342738 A1 * | 11/2021 | Sarferaz | G06Q 10/10 |
| 2022/0248296 A1 * | 8/2022 | Merwaday | H04W 36/30 |

\* cited by examiner

*Primary Examiner* — Phuoc H Nguyen
(74) *Attorney, Agent, or Firm* — Sterne, Kessler, Goldstein & Fox P.L.L.C.

(57) ABSTRACT

Disclosed herein are system, method, and computer program product embodiments for accessing a data service using a data service Uniform Resource Identifier (URI) object. An embodiment operates extracting a name-value pair of each parameter stored in the data service class object. The embodiment generates a parameter context URI using the one or more extracted name-value pairs according to a data service specification of the data service. The embodiment extracts one or more filter range items for each filter option stored in the data service class object. The embodiment generates a filter context URI using the one or more extracted filter range items according to the data service specification of the data service. The embodiment generates a context URI using the parameter context URI and the filter context URI. The embodiment then accesses the data service according to the context URI.

17 Claims, 3 Drawing Sheets

GENERATION OF FILTER AND PARAMETER CONTEXT URIS

BACKGROUND

Background

Protocols such as the Open Data Protocol (OData) allow clients to query and update data on servers. For example, a client may access and use resources on a server according to a protocol that implements the Representational state transfer (REST) application programming interface (API). In particular, the client may request a resource using a Uniform Resource Identifier (URI), and the server may respond with a representation of the resource.

To simplify the use of such protocols, an object-oriented programming class is often used to represent a particular set of resources, collections of resources, or operations. For example, an object of such a class may represent an OData URI with a particular set of parameters and/or filters applied. An object of such a class is often used when navigating from one application to another. More specifically, a source application can transfer its applied parameters and filters for accessing a particular set of resources to a target application in the form of an object of such a class. However, while such a class may provide methods for getting and/or setting individual parameters and/or filters, there is no way to generate the corresponding parameter and/or filter contextual URIs that are actually used to request the particular set of resources.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for accessing a data service using a data service class object representing a set of resources at the data service with the data service class object's particular set of parameters and/or filters applied.

Protocols such as the Open Data Protocol (OData) allow clients to query and update data on servers. For example, a client may access and use resources on a server according to a protocol that implements the Representational state transfer (REST) application programming interface (API). In particular, the client may request a resource using a Uniform Resource Identifier (URI), and the server may respond with a representation of the resource.

To simplify the use of such protocols, an object-oriented programming class is often used to represent a particular set of resources, collections of resources, or operations. For example, an object of such a class may represent an OData URI with a particular set of parameters and/or filters applied. An object of such a class is often used when navigating from one application to another. More specifically, a source application can transfer its applied parameters and filters for accessing a particular set of resources to a target application in the form of an object of such a class. However, while such a class may provide methods for getting and/or setting individual parameters and/or filters, there is no way to generate the corresponding parameter and/or filter contextual URIs that are actually used to request the particular set of resources.

Instead, an application often has to generate parameter and/or filter context URIs on its own. This is often error-prone. In addition to being error prone, this often creates inconsistencies between the parameters and/or filters represented in the URIs generated by the application and the parameters and/or filters actually stored in the data service class object. Embodiments herein solve these technological problems by enabling the generation of parameter and/or filter contextual URIs on the fly automatically. In addition, embodiments herein solve the technological problem of how an application can easily access a data service using a data service class object representing a set of resources at the data service with the data service class object's particular set of parameters and/or filters applied.

Figure 1:
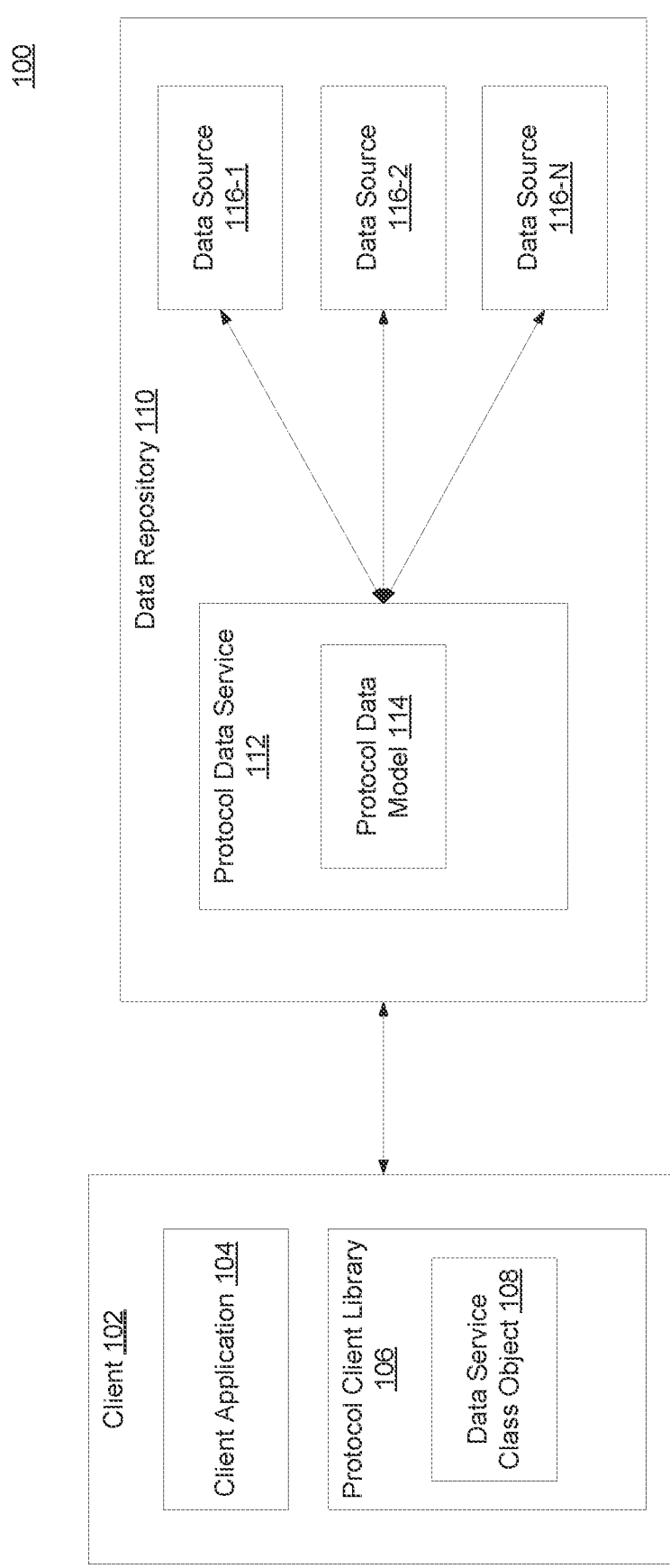
FIG. 1 is a block diagram of a system for accessing a data service using a data service class object representing a set of resources at the data service with the data service class object's particular set of parameters and/or filters applied, according to some embodiments.

FIG. 1 is a block diagram of a system 100 for accessing a data service using a data service class object representing a set of resources at the data service with the data service class object's particular set of parameters and/or filters applied, according to some embodiments. System 100 can include client 102 and data repository 110.

Client 102 can be a desktop computer, laptop, tablet, smartphone, server, cloud computing system, computer cluster, virtual machine, container, or other system or device as would be appreciated by a person of ordinary skill in the art.

Client 102 may be communicatively coupled to data repository 110. For example, client 102 may communicate with data repository 110 over a communications path, which may be wired and/or wireless (or a combination thereof), and which may include any combination of LANs, WANs, the Internet, etc. Control logic and/or data may be transmitted to and from application 108 via the communication path.

Data repository 110 can be a server, cloud computing system, computer cluster, virtual machine, container, desktop computer, laptop, tablet, smartphone, or other device as would be appreciated by a person of ordinary skill in the art.

Data repository 110 may store (or provide access to) one or more data sources 116. Data repository 110 may provide access to the data sources 116 via a protocol data service 112. Protocol data service 112 may expose an endpoint (e.g., a URI) that allows client 102 to access and manipulate the data in different types of data sources 116 using a data access protocol such as, but not limited to, OData.

Protocol data service 112 may use protocol data model 114 to expose the data in different types of data sources 116 to client 102 in a generic way. For example, protocol data service 112 may convert the different format of a data source such as, but not limited to, a Structured Query Language (SQL) relational table into a common data format for use by client 102. Protocol data model 114 may organize and describe the data in the different data sources 116 according to various generic formats. For example, protocol data model 114 may organize the data in the different data sources 116 using an Entity Data Model (EDM). This organization and description of the data in the different data sources 116 according to a generic format can enable client 102 to easily access and manipulate the data in the different data sources 116 even if client 102 is unable to directly process the data in the different data sources 116.

Client 102 may include a client application 104. Client application 104 may be a software application that queries and updates data accessible through data repository 110. Client application 104 may query and update data accessible through data repository 110 via an endpoint exposed by protocol data service 112 of data repository 110.

Client application 104 may use protocol client library 106 to query and update data accessible through data repository 110 via the endpoint exposed by protocol data service 112. Protocol client library 106 may be a set of proxy code used to read the data (sometimes referred to as feeds data) from the endpoint exposed by protocol data service 102.

Client application 104 may access data via the endpoint exposed by protocol data service 112. The endpoint may be a URI. In other words, client application 104 may use a URI to identify resources (e.g., data items) in different data sources 116.

For example, client application 104 may access resources at data repository 110 via http://host/service/, where host is the hostname of data repository 110, and service is the name of a service endpoint exposed at data repository 110. Client application 104 may access various resources by issuing requests to this endpoint. For example, to retrieve resources (e.g., a collection of entities, a single entity, a structural property, a navigation property, a stream, etc.), client application 104 may issue a Hypertext Transfer Protocol (HTTP) GET request to the endpoint. To create a new resource, client application 104 may issue an HTTP PUT request to the endpoint. To update an existing resource, client application 104 may issue an HTTP PUT or an HTTP PATCH request to the endpoint. And to delete a resource, client application 104 may issue an HTTP DELETE request to the endpoint.

In some cases, client application 104 may want to access specific resources at data repository 110 in specific ways. For example, this may be because client application 104 does not need access to all the resources at data source 110 to perform its associated processing. Client application 104 may use parameters and/or filters to access and or request specific resources from data repository 110. A parameter can be a name-value pair input to a protocol data service (e.g., protocol data service 112) that is protocol independent (e.g., independent of the OData protocol). A protocol data service can process a parameter in different ways depending on its goals and needs. And different protocol data services may process the same parameter in different ways depending on their goals and needs.

For example, a parameter can be a name-value pair that restricts the number of resources returned from data repository 110. The parameter name can specify a property of a resource (e.g., the fiscal year for a sales transaction resource) and the parameter value can specify a value that the property of the resource must equal (e.g., 2018) in order for the resource to be returned from data source 110. In other words, a parameter can operate as a simple equivalency relationship on the resources at data repository 110. A parameter may also specify the format that a resource should be returned from data source 110. For example, in the case of a parameter where display_currency is the name and 'EUR' is the value (e.g., display_currency="EUR"), the parameter specifies that resources returned from data repository 110 should be presented in the euro currency.

Client application 104 can access specific resources at data repository 110 by adding a parameter context URI to the endpoint URI. The parameter context URI can include a list of parameters that control what resources are returned (and or how those resources are returned) from the associated endpoint. In the case of the above example, client application 104 may use the following OData URI to get the sales transactions occurring in fiscal year 2018: http://host/service/sales(fiscal_year=2018).

Client application 104 may also use one or more filters to access or request specific resources from data repository 110. A filter can be a query input to a protocol data service (e.g., protocol data service 112) that is protocol dependent (e.g., conforms to the requirements of the OData protocol). A filter may include various values (e.g., range options and or ranges of values) for a given property name of a resource. These values can restrict what resources are returned from a data repository (e.g., data repository 110) via the protocol data service (e.g., protocol data service 112) to those resources that satisfy the values in the filter.

For example, client application 104 may want to request all products with a Name equal to "Milk." Client application 104 may use a filter to do so. In the case of the OData protocol, this may be done with the $filter system query option. The $filter system query option can allow client application 104 to filter a collection of resources that are addressed by a request URI. The expression specified with $filter may be evaluated for each resource in the collection, and items where the expression evaluates to true may be included in the response. In contrast, resources for which the expression evaluates to false or to null, or where such reference properties are unavailable due to permissions, may be omitted from the response. In the case of the above example, client application 104 may use the following OData URI to request all products with a Name equal to "Milk": http://host/service/Products?$filter=Name eq 'Milk'.

To access resources subject to such conditions, client application 104 may need to generate the appropriate URI request. Moreover, client application 104 may need to keep track of the existing parameters and/or filter options previously set by client application 104 if it wants to get an updated version of these resources. In other words, for client application 104 to retrieve a set of resources subject to the same conditions that client application 104 previously requested, client application 104 may need to insert the same parameter and/or filter options in the appropriate URI request.

Client application 104 may logically represent an endpoint URI (e.g., an OData URI) with its parameters and/or filters applied as data service class object 108. This representation can be helpful in a variety of use cases. For example, while navigating from one application to another, the source application (e.g., client application 104) can transfer its currently applied parameters and filter options to the target application in the form of data service class object 108. This can enable the target application to easily resume where the source application left off in terms of requesting resources from data repository 110 subject to the same conditions.

Data service class object 108 may be a class object that provides methods to get and/or set parameter and filter options stored within it and associated with a particular endpoint exposed as a URI (e.g., an endpoint exposed by protocol data service 112). For example, data service class object 108 may provide an addParameter method to add a parameter to data service class object 108 along with a particular value that is to be applied to when requesting resources from the associated endpoint. Similarly, data service class object 108 may provide a getParameter method to retrieve a particular parameter's value stored in data service class object 108.

Data service class object 108 may also provide an add-SelectOption method to add a filter option to data service class object 108 that is to be applied when requesting resources from the associated endpoint. In the case of OData, this filter option may be applied with the $filter system query option. Similarly, data service class object 108 may provide a getSelectOption method to retrieve a particular filter option's values from data service class object 108 such as, but not limited to, range sign, range option, and one or more range values.

Data service class object 108 may provide a getParameterContextURI method that returns the current parameter context URI in data service class object 108. The current parameter context URI may represent the parameters being applied when requesting resources from the associated endpoint. Data service class object 108 may also provide a setParameterContextURI method that sets the parameter context URI in data service class object 108. However, both of these methods may only retrieve and set a raw parameter context URI string. And these methods may do so independently of the getParameter and addParameter methods. In other words, the raw parameter context URI string being returned by the getParameterContextURI method may be inconsistent and/or out of date with the parameters set by the addParameter method and stored in the data service class object 108.

Similarly, data service class object 108 may provide a getFilterContextURI method that returns the current filter context URI in data service class object 108. The current filter context URI may represent the filter options being applied when requesting resources from the associated endpoint. Data service class object 108 may also provide a setFilterContextURI method that sets the current filter context URI. However, both of these methods may only retrieve and set a raw filter context URI. And these methods may do so independently of the getSelectOption and addSelectOption methods. In other words, the raw filter context URI string being returned by the getFilterContextURI method may be inconsistent and/or out of date with the filters set by the addSelectOption method and stored in the data service class object 108.

However, to request the relevant resources, client application 104 may need to issue a request to the associated endpoint having the correct raw parameter context URI and/or raw filter context URI. In other words, client application 104 may need to convert data service class object 108 back to an endpoint URI (e.g., an OData URI) with its appropriate parameters and/or filters applied. More specifically, client application 104 may need to easily and accurately generate parameter context URIs and/or filter context URIs from the underlying individual parameter and/or filter options set in data service class object 108. Client application 104 may also need to access protocol data service 112 using data service class object 108 with data service class object 108's particular set of parameters and/or filters applied.

According to some aspects of this disclosure, client application 104 may operate to access a data service (e.g., an endpoint exposed by protocol data service 112) using a data service class object 108. Client application 104, using an algorithm in protocol client library 106, may operate to access protocol data service 112 using a data service class object 108. However, client application 104 may also operate to access protocol data service 112 using an algorithm stored outside protocol client library 106.

According to some aspects of this disclosure, to convert data service class object 108 (with its individually set parameters and or filters) to an endpoint URI (e.g., an OData URI) with the parameters and/or filters applied, client application 104, via the algorithm, may first generate a parameter context URI. Client application 104, via the algorithm, may then generate a filter context URI. Finally, client application 104, via the algorithm, may generate a context URI from the parameter context URI and/or the filter context URI. Client application 104 may then use the context URI to access the endpoint URI (e.g., an OData URI) with the appropriate parameters and/or filters applied.

In the description below, it is to be understood that client application 104 may use an algorithm in protocol client library 106 (or implemented outside protocol client library 106) to perform the described functions to convert data service class object 108 back to an endpoint URI (e.g., an OData URI) with its appropriate parameters and/or filters applied.

To generate the parameter context URI, client application 104 may first extract a name-value pair of each parameter stored in the data service class object 108. Each name-value pair may comprise a name of the parameter (also referred to as a property name), and a value of the parameter (also referred to as a property value). For example, in the case of client application 104 requesting sales transactions in euros for 2018, client application 104 can generate a parameter context URI of (display_currency='EUR', fiscal_year=2018).

Client application 104 may then generate the parameter context URI using the one or more extracted name-value pairs according to a data service specification (e.g., the OData protocol) of the data service (e.g., an endpoint exposed by protocol data service 112). To generate the parameter context URI, client application 104 may transform an extracted name-value pair of the one or more name-value pairs extracted from data service class object 108 according to the data service specification. This transforming may involve modifying a value of an extracted name-value pair based on a data type of the value (e.g., a string, a Boolean value, an integer value, etc.). For example, client application 104 may modify a value containing a string by adding quotation marks around the string.

To generate the parameter context URI, client application 104 may further generate a string based on the one or more extracted name-value pairs (including but not limited to any transformed extracted name-value pairs). Client application 104 may then format the generated string according to a data service specification (e.g., the OData protocol) of the data service (e.g., an endpoint exposed by protocol data service 112). For example, in the case of the OData protocol, client application 104 may modify the string by adding parentheses around the string.

To generate a filter context URI, client application 104 may extract one or more filter range items for each filter option stored in the data service class object 108. Each filter option may specify a property (e.g., a named characteristic) for which each filter range item applies. Each filter range item may specify a range sign, a range option, and one or more range values for the corresponding filter option. The range sign may specify whether the selection range is inclusive (e.g., "I") or exclusive (e.g., "E"). The range option may specify the type of comparison to apply. For example, the range option may specify that the property equals a value (e.g., "EQ"). The range option may specify that the property is not equal to a value (e.g., "NE"). The range option may specify that the property is less than or equal to a value (e.g., "LE"). The range option may specify that the property is less than a value (e.g., "LT"). The range option may specify that the property is greater than or equal to a value (e.g., "GE"). The range option may specify that the property is greater than a value (e.g., "GT"). The range option may specify that the property is between two values (e.g., "BT"). The range option may specify that the property contains a pattern in the value (e.g., "CP"). A range value may specify a single value or the lower boundary of an interval of the range. A range value may specify an upper boundary of an interval of the range (e.g., if the range option specifies the property is between two values).

Client application 104 may extract the one or more filter range items stored in data service class object 108 into simple filter range items and negation filter range items. A simple filter range item may specify a specific range of values for which the property of the corresponding filter option is included. A negation filter range item may specify a specific range of values for which the property of the corresponding filter option is excluded. Client application 104 may represent a negation filter range item as a simple filter range item to simplify the generation of the filter context URI.

To extract one or more simple filter range items, client application 104, for each filter option stored in data service class object 108, may extract those filter range items that satisfy one or more conditions. For example, client application 104 may extract those filter range items for each filter option stored in data service class object 108 that satisfy two conditions. The first condition may specify that the range sign of a corresponding filter range item is inclusive (e.g., "I") and the range option of the corresponding filter range item is different from unequal (e.g., "NE"). The second condition may specify that the range sign of the corresponding filter range item is exclusive (e.g., "E") and the range option of the corresponding filter range item is unequal (e.g., "NE").

To extract negation filter range items, client application 104 may extract those filter range items for each filter option stored in data service class object 108 that satisfy two conditions. The first condition may specify that the range sign of a corresponding filter range item is inclusive (e.g., "I") and the range option of the corresponding filter range item is unequal (e.g., "NE"). The second condition may specify that the range sign of the corresponding filter range item is exclusive (e.g., "E") and the range option of the corresponding filter range item is different from unequal (e.g., "NE").

Client application 104 may then generate the filter context URI using the one or more extracted filter range items according to a data service specification (e.g., the OData protocol) of the data service (e.g., an endpoint exposed by protocol data service 112). To generate the filter context URI, client application 104 may generate a simple range string using the one or more extracted simple filter range items. Client application 104 may also generate a negation range string using the one or more extracted negation filter range items.

Client application 104 may generate the simple range string based on the range option and the range sign of each of the one or more extracted simple filter range items. Client application 104 may generate the negation range string based on the range option and the range sign of each of the one or more extracted simple filter range items. Client application 104 may then generate the filter context URI using the simple range string and the negation range string. For example, in the case of client application 104 requesting customers in Spain where the Payment_Terms_Code is equal to 14 days, client application 104 can generate a filter context URI of ?$filter=Country_Region_Code eq 'ES' and Payment_Terms_Code eq '14 DAYS'.

Figure 2:
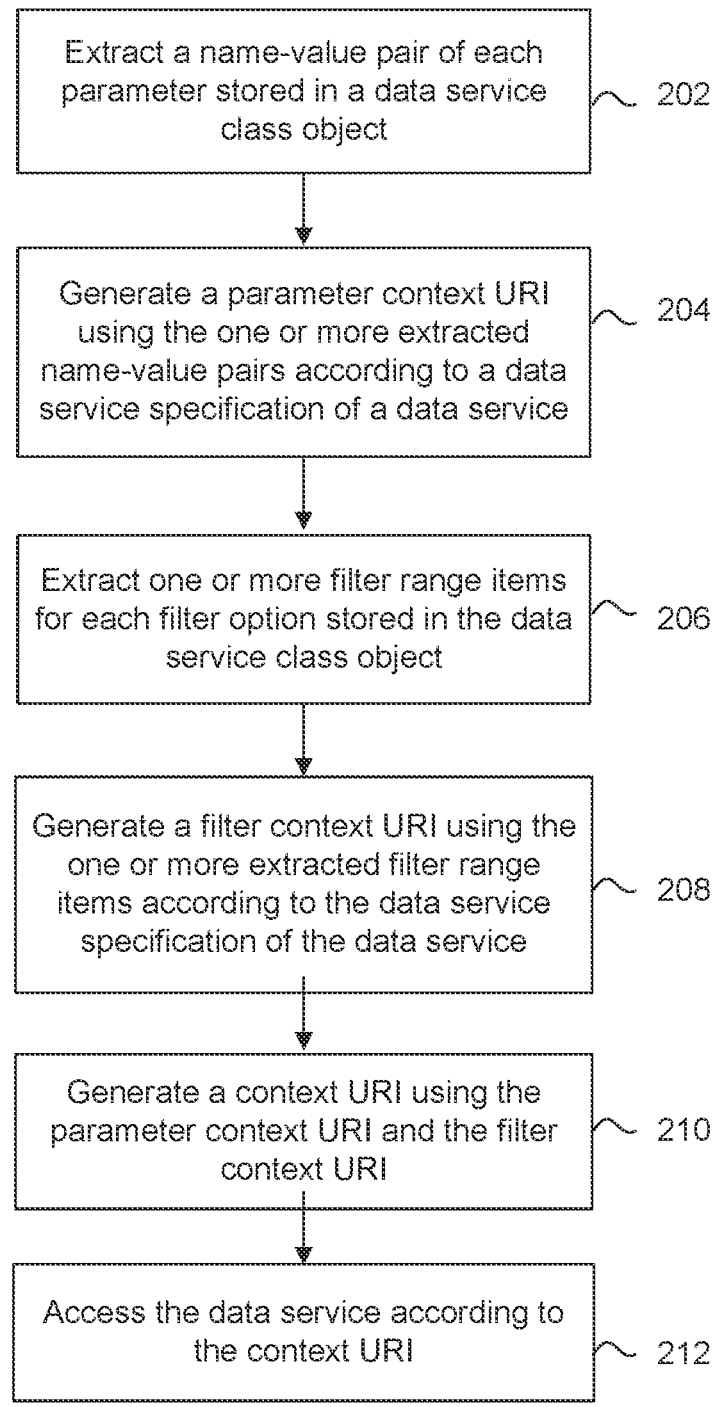
FIG. 2 is a flowchart illustrating a process for accessing a data service using a data service Uniform Resource Identifier (URI) object representing a set of resources at the data service with the data service class object's particular set of parameters and/or filters applied, according to some embodiments.

FIG. 2 is a flowchart for a method 200 for accessing a data service using a data service Uniform Resource Identifier (URI) object representing a set of resources at the data service with the data service class object's particular set of parameters and/or filters applied, according to an embodiment. Method 200 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 3, as will be understood by a person of ordinary skill in the art.

Method 200 shall be described with reference to FIG. 1. However, method 200 is not limited to that example embodiment. Client application 104 may perform the steps of method 300 via an algorithm implemented in protocol client library 106. However, client application 104 may perform the steps of method 200 via an algorithm implemented outside of protocol client library 106.

In 202, client application 104 extracts a name-value pair of each parameter stored in data service class object 108.

In 204, client application 104 generates a parameter context URI using the one or more extracted name-value pairs according to a data service specification of protocol data service 112. For example, the data service specification may be the OData protocol specification.

To generate the parameter context URI, client application 104 may transform an extracted name-value pair of the one or more extracted name-value pairs according to the data service specification. This transforming further involve modifying a value of an extracted name-value pair based on a data type of the value (e.g., a string, a Boolean value, an integer value, etc.). For example, client application 104 may modify a value containing a string by adding quotation marks around the string.

To generate the parameter context URI, client application 104 may further generate a string based on the one or more extracted name-value pairs (including but not limited to any transformed extracted name-value pairs). Client application 104 may then format the generated string according to a data service specification (e.g., the OData protocol) of protocol data service 112. For example, in the case of the OData protocol, client application 104 may modify the string by adding parentheses around the string.

In an embodiment, 202 and 204 may be implemented according to the following example pseudocode. However, in other embodiments, 202 and 204 can be implemented using other code/pseudocode/algorithms.

Define function wrapBrackets(str)
        return "("+str+")"
    end function
    Define String parameterContextURI=" "
    LOOP though each PARAMETER of data service class object 108
    IF parameterContextURI !=" "

parameterContextURI=parameterContextURI+","
END IF
Define String transformedValue=getTransformedValue
  (PARAMETER→Value)
    parameterContextURI=parameterContextURI+PARAMETER→Name+"="+transformedValue
END LOOP
parameterContextURI=wrapBrackets(parameterContextURI)

In 206, client application 104 extracts one or more filter range items for each filter option stored in data service class object 108. Each filter range item may include a property, a range sign, a range option, and one or more range values stored in the corresponding filter option.

Client application 104 may extract the one or more filter range items into simple filter range items and negation filter range items. A simple filter range item may specify that the associated filter option is included within a specific range of values. A negation filter range item may specify that the associated filter option is excluded from a specific range of values. Client application 104 may represent a negation filter range item as a simple filter range item to simplify the generation of the filter context URI.

To extract one or more simple filter range items, client application 104, for each filter option stored in data service class object 108, may extract those filter range items that satisfy one or more conditions. For example, client application 104 may extract those filter range items for each filter option stored in data service class object 108 that satisfy two conditions. The first condition may specify that the range sign of a corresponding filter range item is inclusive (e.g., "I") and the range option of the corresponding filter range item is different from unequal (e.g., "NE"). The second condition may specify that the range sign of the corresponding filter range item is exclusive (e.g., "E") and the range option of the corresponding filter range item is unequal (e.g., "NE").

To extract negation filter range items, client application 104 may extract those filter range items for each filter option stored in data service class object 108 that satisfy two conditions. The first condition may specify that the range sign of a corresponding filter range item is inclusive (e.g., "I") and the range option of the corresponding filter range item is unequal (e.g., "NE"). The second condition may specify that the range sign of the corresponding filter range item is exclusive (e.g., "E") and the range option of the corresponding filter range item is different from unequal (e.g., "NE").

In 208, client application 104 generates a filter context URI using the one or more extracted filter range items according to the data service specification of protocol data service 112. To generate the filter context URI, client application 104 may generate a simple range string using the one or more extracted simple filter range items. Client application 104 may also generate a negation range string using the one or more extracted negation filter range items.

Client application 104 may generate the simple range string based on the range option and the range sign of each of the one or more extracted simple filter range items. Client application 104 may generate the negation range string based on the range option and the range sign of each of the one or more extracted negation filter range items.

Client application 104 may generate the filter context URI using the simple range string and the negation range string. For example, client application 104 may generate the filter context URI by concatenating the simple range string with the negation range string.

In an embodiment, 306 and 308 are implemented according to the following example pseudocode. However, in other embodiments, 306 and 308 can be implemented using other code/pseudocode/algorithms.

```
Define function wrapBrackets(str)
    return "("+str+")"
end function
Define function getTransformedValue(value)
    define string returnValue
    IF data type of value is boolean or integer.
        returnValue=value.
    ELSE
        returnValue=""""+value+""""
    END IF
    return returnValue
end function
define function addLogicalOPerator(existingString, newString, Include)
    define string operator="or"
    define string tempStr=newStr.
    IF Include="E" THEN
        tempStr="not"+" "+newStr
        operator="and"
    ENDIF
    IF existingStr=" " THEN
        return tempStr
    ENDIF
    return existingStr+" "+operator+" "+tempStr end function
Define function getFilterQuery(filterOption, filterRangeItems, Include)
    define string existingStr
    loop though each filterRange of filterRangeItems
        define string newString
        IF filterRange→Option="BT" THEN
            define                                   string
                transformedLow=getTransformedValue(filterRange→Low)
            define                                   string
                transformedHigh=getTransformedValue(filterRange→High)
            newString=filterOption+"ge"+transformedLow+
                "and le"+transformedHigh
            newString=wrapBrackets (newString)
        ELSE IF filterRange→Option="CP" THEN
            define                                   string
                transformedLow=getTransformedValue(filterRange→Low)
            newString=transformedLow+","+filterOption
            newString=wrapBrackets (newString)
            newString="substringof"+newString
        ELSE
            newString=filterOption+"    "+filterRange→Option+" "+transformedLow
        ENDIF
        existingStr=addLogicalOPerator(existingString,
            newString, Include)
    end loop
    return existingStr
end function.
Loop through all filter options of data service class object
    108
    Declare Array simpleFilterRangeItems
    Declare Array negationFilterRangeItems
    Define String filterQuery=" "
    Loop though each filterRangeItem of the current filter
        option
```

```
IF filterRangeItem→Sign="I" THEN
    IF filterRangeItem→option="NE" THEN
        Push filterRangeItem into negationFilter-
            RangeItems
    ELSE
        Push filterRangeItem into simpleFilterRangeIt-
            ems
    ENDIF
ELSE
    IF filterRangeItem→option="NE" THEN
        Push filterRangeItem into simpleFilterRangeIt-
            ems
    ELSE
        Push filterRangeItemRange into negationFilter-
            RangeItemsaNegation
    ENDIF
ENDIF
End loop
define string simpleRangeQuery=getFilterQuery(data
    service class object 108→filter option, simpleFilter-
    RangeItems, "I") simpleRangeQuery=wrapBrackets
    (simpleRangeQuery)
define string negationRangeQuery=getFilterQuery
    (data service class object 108→filter option, nega-
    tionFilterRangeItems,                           "E")
    negationRangeQuery=wrapBrackets      (negation-
    RangeQuery)
define string complex=simpleRangeQuery+"and"+ne-
    gationRangeQuery
filter context URI=filter context URI+"and"+complex
End loop
filter context URI="$filter="+filter context URI
```

In 210, client application 104 generates a context URI using the parameter context URI and the filter context URI. For example, client application 104 may generate the context URI by concatenating the parameter context URI with the filter context URI.

In 212, client application 104 accesses protocol data service 112 of data repository 110 according to the context URI. Client application 104 may submit a request to a URI comprising a service root URI, a resource path, and the context URI. For example, client application 104 may submit a HTTP GET request to an endpoint represented by a URI comprising a service root URI, a resource path, and the context URI.

Figure 3:
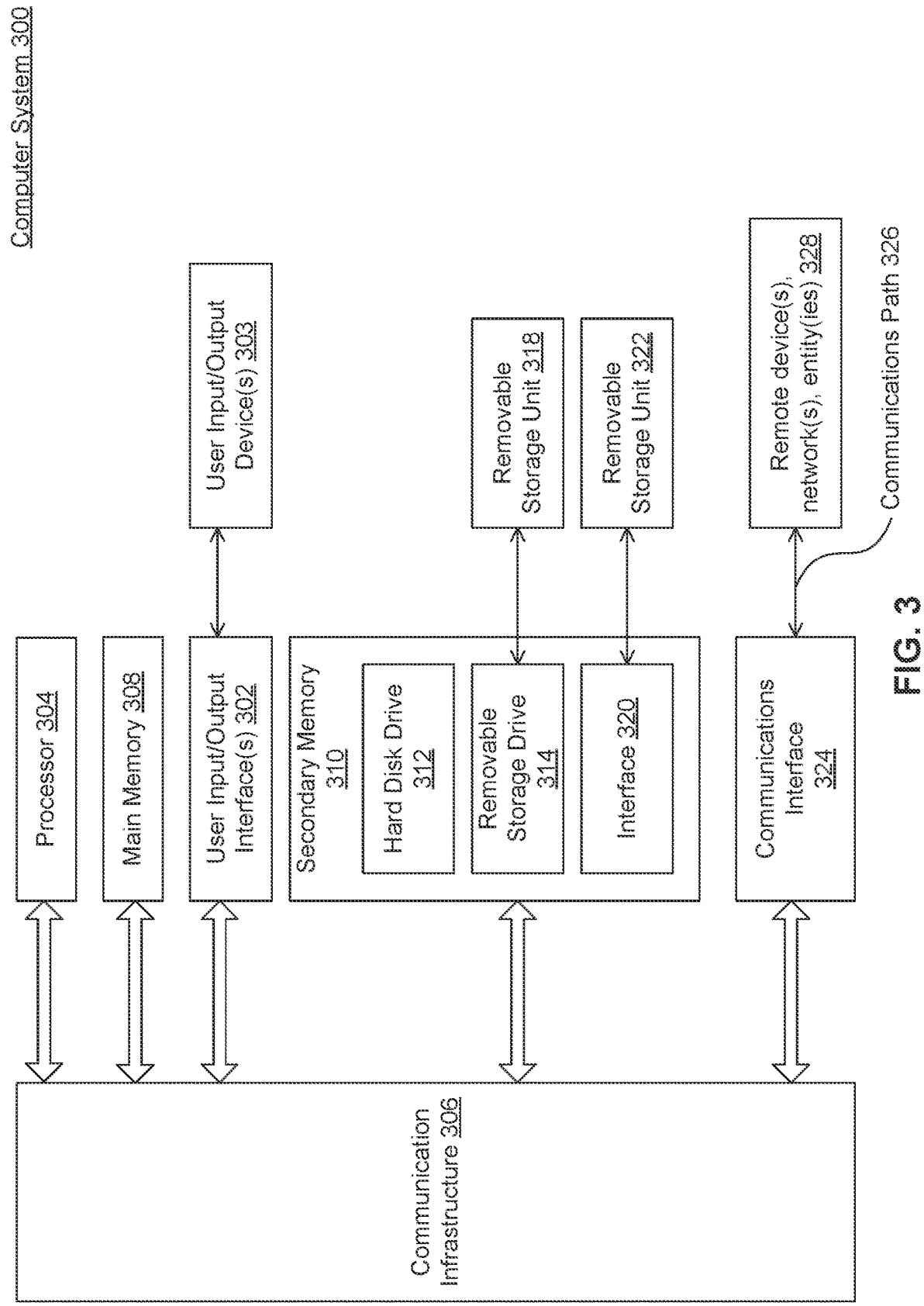
FIG. 3 is an example computer system useful for implementing various embodiments.

Various embodiments may be implemented, for example, using one or more well-known computer systems, such as computer system 300 shown in FIG. 3. One or more computer systems 300 may be used, for example, to implement any of the embodiments discussed herein, as well as combinations and sub-combinations thereof.

Computer system 300 may include one or more processors (also called central processing units, or CPUs), such as a processor 304. Processor 304 may be connected to a communication infrastructure or bus 306.

Computer system 300 may also include user input/output device(s) 303, such as monitors, keyboards, pointing devices, etc., which may communicate with communication infrastructure 306 through user input/output interface(s) 302.

One or more of processors 304 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 300 may also include a main or primary memory 308, such as random access memory (RAM). Main memory 308 may include one or more levels of cache. Main memory 308 may have stored therein control logic (i.e., computer software) and/or data.

Computer system 300 may also include one or more secondary storage devices or memory 310. Secondary memory 310 may include, for example, a hard disk drive 312 and/or a removable storage device or drive 314. Removable storage drive 314 may be a floppy disk drive, a magnetic tape drive, a compact disk drive, an optical storage device, tape backup device, and/or any other storage device/drive.

Removable storage drive 314 may interact with a removable storage unit 318. Removable storage unit 318 may include a computer usable or readable storage device having stored thereon computer software (control logic) and/or data. Removable storage unit 318 may be a floppy disk, magnetic tape, compact disk, DVD, optical storage disk, and/any other computer data storage device. Removable storage drive 314 may read from and/or write to removable storage unit 318.

Secondary memory 310 may include other means, devices, components, instrumentalities or other approaches for allowing computer programs and/or other instructions and/or data to be accessed by computer system 300. Such means, devices, components, instrumentalities or other approaches may include, for example, a removable storage unit 322 and an interface 320. Examples of the removable storage unit 322 and the interface 320 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 300 may further include a communication or network interface 324. Communication interface 324 may enable computer system 300 to communicate and interact with any combination of external devices, external networks, external entities, etc. (individually and collectively referenced by reference number 328). For example, communication interface 324 may allow computer system 300 to communicate with external or remote devices 328 over communications path 326, which may be wired and/or wireless (or a combination thereof), and which may include any combination of LANs, WANs, the Internet, etc. Control logic and/or data may be transmitted to and from computer system 300 via communication path 326.

Computer system 300 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 300 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 300 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 300, main memory 308, secondary memory 310, and removable storage units 318 and 322, as well as tangible articles of manufacture embodying any combination of the foregoing. Such control logic, when executed by one or more data processing devices (such as computer system 300), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 3. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer implemented method for accessing a data service using a data service Uniform Resource Identifier (URI) object, comprising:

extracting a name-value pair of each parameter stored in the data service URI object;

generating a parameter context URI using the one or more extracted name-value pairs according to a data service specification of the data service;

extracting one or more simple filter range items for each filter option stored in the data service URI object based on a first condition or a second condition, where the first condition specifies that a range sign of the corresponding simple filter range item is inclusive and a range option of the corresponding simple filter range item is different from unequal, and the second condition specifies that the range sign of the corresponding simple filter range item is exclusive and the range option of the corresponding simple filter range item is unequal;

extracting one or more negation filter range items for each filter option stored in the data service URI object based on a third condition or a fourth condition, where the third condition specifies that a range sign of the corresponding negation filter range item is inclusive and a range option of the corresponding negation filter range item is unequal, and the second condition specifies that the range sign of the corresponding negation filter range item is exclusive and the range option of the corresponding negation filter range item is different from unequal;

generating a simple range string based on the range option and the range sign of each of the one or more extracted simple filter range items and according to the data service specification of the data service;

generating a negation range string based on the range option and the range sign of each of the one or more extracted negation filter range items and according to the data service specification of the data service;

generating a context URI using the parameter context URI, the simple range string, and the negation range string; and accessing the data service according to the context URI.

2. The method of claim 1, wherein the data service specification comprises an Open Data Protocol (OData) specification.

3. The method of claim 1, wherein the generating the parameter context URI comprises:
transforming an extracted name-value pair of the one or more extracted name-value pairs according to the data service specification, wherein the transforming comprises modifying the value of the extracted name-value pair based on a data type of the value;
generating a string based on the one or more extracted name-value pairs; and
formatting the string according to the data service specification, thereby generating the parameter context URI.

4. The method of claim 1, wherein the generating the context URI comprises:
concatenating the simple range string and the negation range string.

5. The method of claim 1, wherein the accessing the data service comprises:
submitting a request to a URI comprising a service root URI, a resource path, and the context URI.

6. The method of claim 1, wherein the range option of each of the one or more extracted simple filter range items specifies that a property of the respective simple filter range item is less than or equal to a value, less than a value, greater than or equal to a value, greater than a value, between two values, contains a pattern in a value, equals a single value, is a lower boundary of an interval of the range of the respective simple filter range item, or is an upper boundary of an interval of the range of the respective simple filter range item.

7. A system, comprising:
a memory; and
at least one processor coupled to the memory and configured to:
extract a name-value pair of each parameter stored in a data service URI object;
generate a parameter context URI using the one or more extracted name-value pairs according to a data service specification of a data service;
extract one or more simple filter range items for each filter option stored in the data service URI object based on a first condition or a second condition, where the first condition specifies that a range sign of the corresponding simple filter range item is inclusive and a range option of the corresponding simple filter range item is different from unequal, and the second condition specifies that the range sign of the corresponding simple filter range item is exclusive and the range option of the corresponding simple filter range item is unequal;
extract one or more negation filter range items for each filter option stored in the data service URI object based on a third condition or a fourth condition, where the third condition specifies that a range sign of the corresponding negation filter range item is inclusive and a range option of the corresponding negation filter range item is unequal, and the second condition specifies that the range sign of the corresponding negation filter range item is exclusive and the range option of the corresponding negation filter range item is different from unequal;
generate a simple range string based on the range option and the range sign of each of the one or more extracted simple filter range items and according to the data service specification of the data service;
generate a negation range string based on the range option and the range sign of each of the one or more extracted negation filter range items and according to the data service specification of the data service;
generate a context URI using the parameter context URI, the simple range string, and the negation range string; and
access the data service according to the context URI.

8. The system of claim 7, wherein the data service specification comprises an Open Data Protocol (OData) specification.

9. The system of claim 7, wherein to generate the parameter context URI, the at least one processor further configured to:
transform an extracted name-value pair of the one or more extracted name-value pairs according to the data service specification, wherein the transforming comprises modifying the value of the extracted name-value pair based on a data type of the value;
generate a string based on the one or more extracted name-value pairs; and
format the string according to the data service specification, thereby generating the parameter context URI.

10. The system of claim 7, wherein to generate the context URI, the at least one processor further configured to:
concatenate the simple range string and the negation range string.

11. The system of claim 7, wherein to accessing the data service, the at least one processor further configured to:
submit a request to a URI comprising a service root URI, a resource path, and the context URI.

12. The system of claim 7, wherein the range option of each of the one or more extracted simple filter range items specifies that a property of the respective simple filter range item is less than or equal to a value, less than a value, greater than or equal to a value, greater than a value, between two values, contains a pattern in a value, equals a single value, is a lower boundary of an interval of the range of the respective simple filter range item, or is an upper boundary of an interval of the range of the respective simple filter range item.

13. A non-transitory computer-readable medium having instructions stored thereon that, when executed by at least one computing device, causes the at least one computing device to perform operations comprising:
extracting a name-value pair of each parameter stored in a data service URI object;
generating a parameter context URI using the one or more extracted name-value pairs according to a data service specification of a data service;
extracting one or more simple filter range items for each filter option stored in the data service URI object based on a first condition or a second condition, where the first condition specifies that a range sign of the corresponding simple filter range item is inclusive and a range option of the corresponding simple filter range item is different from unequal, and the second condition specifies that the range sign of the corresponding simple filter range item is exclusive and the range option of the corresponding simple filter range item is unequal;
extracting one or more negation filter range items for each filter option stored in the data service URI object based on a third condition or a fourth condition, where the third condition specifies that a range sign of the corresponding negation filter range item is inclusive and a range option of the corresponding negation filter range item is unequal, and the second condition specifies that the range sign of the corresponding negation filter range item is exclusive and the range option of the corresponding negation filter range item is different from unequal;

generating a simple range string based on the range option and the range sign of each of the one or more extracted simple filter range items and according to the data service specification of the data service;

generating a negation range string based on the range option and the range sign of each of the one or more extracted negation filter range items and according to the data service specification of the data service;

generating a context URI using the parameter context URI, the simple range string, and the negation range string; and accessing the data service according to the context URI.

14. The non-transitory computer-readable medium of claim 13, wherein the generating the parameter context URI comprises:

transforming an extracted name-value pair of the one or more extracted name-value pairs according to the data service specification, wherein the transforming comprises modifying the value of the extracted name-value pair based on a data type of the value;

generating a string based on the one or more extracted name-value pairs; and formatting the string according to the data service specification, thereby generating the parameter context URI.

15. The non-transitory computer-readable medium of claim 13, wherein the generating the context URI comprises:

concatenating the simple range string and the negation range string.

16. The non-transitory computer-readable medium of claim 13, wherein the accessing the data service comprises:

submitting a request to a URI comprising a service root URI, a resource path, and the context URI.

17. The non-transitory computer-readable medium of claim 13, wherein the range option of each of the one or more extracted simple filter range items specifies that a property of the respective simple filter range item is less than or equal to a value, less than a value, greater than or equal to a value, greater than a value, between two values, contains a pattern in a value, equals a single value, is a lower boundary of an interval of the range of the respective simple filter range item, or is an upper boundary of an interval of the range of the respective simple filter range item.

* * * * *